United States Patent
Pringle et al.

(10) Patent No.: US 7,184,493 B1
(45) Date of Patent: Feb. 27, 2007

(54) PULSE SORTING APPARATUS FOR FREQUENCY HISTOGRAMMING IN A RADAR RECEIVER SYSTEM

(75) Inventors: Richard Charles Pringle, Van Nuys, CA (US); Joanna S. Quan, West Hills, CA (US)

(73) Assignee: Alliant Techsystems Inc., Edina, MN (US)

( * ) Notice: Subject to any disclaimer, the term of this patent is extended or adjusted under 35 U.S.C. 154(b) by 919 days.

(21) Appl. No.: 10/270,864

(22) Filed: Oct. 15, 2002

Related U.S. Application Data

(60) Provisional application No. 60/354,548, filed on Feb. 5, 2002.

(51) Int. Cl.
*H03K 9/00* (2006.01)
*H04L 27/00* (2006.01)

(52) U.S. Cl. ............ 375/316; 375/275; 375/335; 342/18; 342/111; 342/116

(58) Field of Classification Search ........... 375/316, 375/275, 355; 342/111, 116, 18
See application file for complete search history.

(56) References Cited

U.S. PATENT DOCUMENTS

| | | | | |
|---|---|---|---|---|
| 4,538,150 A | * | 8/1985 | Bone, Jr. | 342/174 |
| 4,721,958 A | * | 1/1988 | Jenkin | 342/13 |
| 4,928,105 A | * | 5/1990 | Langner | 342/192 |
| 5,063,385 A | * | 11/1991 | Caschera | 342/13 |
| 5,291,199 A | * | 3/1994 | Overman et al. | 342/13 |
| 5,668,828 A | * | 9/1997 | Sanderford et al. | 375/136 |
| 5,704,057 A | | 12/1997 | Cho | |
| 6,281,833 B1 | * | 8/2001 | Pringle et al. | 342/95 |

OTHER PUBLICATIONS

Richard G. Wiley, "Deinterleaving Pulse Trains", *The Analysis of Radar Signals*, 1993, pp. 237-249, Second Ed., Artech House, Inc., Norwood, MA., USA.

* cited by examiner

*Primary Examiner*—Jay K. Patel
*Assistant Examiner*—Ted M. Wang
(74) *Attorney, Agent, or Firm*—Michael Blaine Brooks, P.C.; Michael B. Brooks; Andrew S. Naglestad

(57) ABSTRACT

Disclosed is a real-time pulse sorting apparatus of a preprocessor in a pulsed radiation detection system. The apparatus, responsive to digital signals generated by a system receiver, uses the instantaneous frequency as the address input to store discrete data groups in main memory. Each data group, comprising the digital data corresponding to a single analog-to-digital converter sample point, includes the RF signal amplitude, inter-channel phase difference, instantaneous frequency as well as a unique pulse number generated by the pulse sorting apparatus. The present invention further includes a TOA memory for storing the time-of-arrival of each pulse at an address given by the pulse number. The main memory, organized in the form of a frequency-based histogram, together with the TOA memory, linked to the main memory by means of the pulse number pointer, sorts and records RF signal data with minimal processor control and intervention.

23 Claims, 5 Drawing Sheets

400

| WR ADDR | HIGH BYTE | LOW BYTE | RD ADDR |
|---|---|---|---|
| K | TEMP 271 | FREQ 274 | L |
| K+1 | $PHASE_2$ | $PHASE_1$ | L+1 |
| K+2 | $PHASE_4$ | $PHASE_3$ | L+1 |
| K+3 | $PHASE_6$ | $PHASE_5$ | L+1 |
| K+4 | $AMPLITUDE_2$ | $AMPLITUDE_1$ | L+2 |
| K+5 | $AMPLITUDE_4$ | $AMPLITUDE_3$ | L+2 |
| K+6 | $AMPLITUDE_6$ | $AMPLITUDE_5$ | L+3 |
| K+7 | PULSE No.[11:8] W/ SEL CH[2:0] | PULSE No.[7:0] | L+3 |

269 braces K+1 through K+3
267 braces K+4 through K+6
279 braces K+7

FIG. 4

| RADAR INTERUPT / ACTIVITY | n | n+1 | n+2 | n+3 | n+4 |
|---|---|---|---|---|---|
| i | SAMPLE DATA INTO FIFO | FIFO DATA TO RAM | PROCESS RAM DATA | — | — |
| i+1 | — | SAMPLE DATA INTO FIFO | FIFO DATA TO RAM | PROCESS RAM DATA | — |
| i+2 | — | — | SAMPLE DATA INTO FIFO | FIFO DATA TO RAM | PROCESS RAM DATA |

FIG. 5

PULSE SORTING APPARATUS FOR FREQUENCY HISTOGRAMMING IN A RADAR RECEIVER SYSTEM

CROSS REFERENCE TO RELATED APPLICATIONS

This application claims priority from the following U.S. provisional Patent Application, the disclosure of which, including all appendices and all attached documents, is incorporated by reference in its entirety for all purposes: U.S. Provisional Patent Application Ser. No. 60/354,548, Richard Charles Pringle and Joanna S. Quan entitled, "DIGITAL SIGNAL GATING AND PULSE SORTING APPARATUS AND METHOD IN A PULSE RECEIVER SYSTEM," filed Feb. 5, 2002. The present application also contains subject matter related to the subject matter disclosed in the following commonly-owned copending application that is being filed concurrently, and is hereby incorporated by reference in its entirety for all purposes: U.S. patent application Ser. No. 10/268,170, issued as U.S. Pat. No. 7,082,172, to Richard Charles Pringle and Joanna S. Quan entitled, "DIGITAL SIGNAL GATING APPARATUS AND METHOD IN A PULSE RECEIVER SYSTEM."

FEDERALLY SPONSORED RESEARCH

The invention was made with Government support under N00019-94-C-0078 awarded by the Department of the Navy. The Government has certain rights in the invention.

FIELD OF THE INVENTION

The present invention relates generally to data sorting and more particularly to real-time data sorters that associate incoming streams of data points in order to reduce the overall computational burden of frequency histogramming.

BACKGROUND OF THE INVENTION

Data sorting and pulse sorting in particular are often integral to the real-time tracking of radar emitters. Modernly, a typical radar tracking system includes a receiver system and a digital processing system. The receiver system is typically having of an antenna, or antenna elements themselves having antenna array, a multi-channel receiver, signal down-conversion, and some analog processing. The digital processing system is typically includes of dedicated, high-speed hardware processing and software/CPU-based processing.

In order to sort, associate or reject each signal from the myriad of signals that a sensitive radar tracking system intercepts, each instantaneous signal intercepted by the receiver system is typically characterized by a set of parameters prior to storage and processing. This characterization provides the information required to associate a set of signals belonging to a particular emitter and to uniquely identify the particular emitter from among the several emitters whose signals may have been intercepted. The parameters generally measured by the receiver system for a pulsed signal include carrier frequency or radio frequency (RF), pulse amplitude (PA), pulsewidth (PW), time-of-arrival (TOA), and angle-of-arrival (AOA). Also, in some systems, polarization of the input signal is measured. Frequency modulation on-the-pulse (FMOP) is another parameter that can be used to identify a particular emitter and also can be used to determine chirp rate of the phase coding of a signal using pulse compression. Continuous wave (CW) signals are generally identified as those signals whose pulse lengths exceed several hundred microseconds.

TOA measures are made with respect to an internal clock at the leading edge of the pulse. AOA measures can be enhanced or replaced by AOA determination processes typically calculated in the software digital processing. With interferometric devices, it is typical that the amplitude and phase difference for each channel, receiver temperature and instantaneous frequency of every digital sampling point of a valid pulse be both designated by a unique pulse number and recorded. The parameters measured on a single intercepted pulse are typically stored in a data vector called a pulse descriptor word (PDW) or a "data group." Multiple PDWs form a set of vectors in parameter space. By matching vectors from multiple pulses, it is possible to isolate those signals associated with a particular emitter. This process of association and isolation of signals is called deinterleaving.

Deinterleaving can be accomplished through pulse-by-pulse processing techniques relying on the matching of a number of pulse characteristics (e.g., RF, AOA and TOA) and can benefit greatly from histogram pre-processing approaches. Thereafter, pulse repetition intervals (PRI) and other derived parameters can be computed for enhanced emitter characterization.

The pulse-by-pulse deinterleaving of pulse trains can be significantly complicated by missing or corrupted PDWs leading to an increase in false emitter detections. Histogram processing approaches are far less sensitive to missed or corrupted pulse measurements and are often used as pre-sorters for conventional pulse-by-pulse processing techniques. RF/AOA cells can be used in a histogram processing approach where, upon achieving a predetermined number of PDWs, the contents of the cell are processed using conventional pulse-by-pulse processing approaches. While RF/AOA histogram processing is typically of low resolution, there are efforts to extend the histogramming approach to RF and time-difference-of-arrival (TDOA) organized data. U.S. Pat. No. 5,063,385 issued to J. Caschera addresses the memory intensive nature of this extended histogramming approach.

Deinterleaving can be computationally burdensome. The prior art recognizes that in order to relieve some of this burden, one must relocate some of the sorting functions to upstream hardware devices. U.S. Pat. No. 5,704,057 issued to K. Cho attempts to relieve some of this computational burden with a sorted addressable memory that associates TOA with AOA or other relevant parameters such as the RF. Unfortunately, the approach inherently lacks an economy of scale because the implementation scales linearly with the parameters to be associated with TOA. In addition, there is no interrelation between the sorted parameters.

The several embodiments of the present invention address a pressing need to deinterleave detected emissions with computationally efficient histogramming techniques as part of the signal pre-processing that may be followed by pulse-by-pulse processing.

The several embodiments of the present invention produce pre-sorted data with electronics relying on minimal aid from extrinsic processing resources. In addition, the several embodiments of the present invention provide pre-sorted data that permits the processor to selectively retrieve small portions of the pulse data that are most likely to correspond to a particular emitter within a multi-emitter environment. The several embodiments of the present invention satisfy the pressing need through efficient data grouping and a bifurcation of the data processing along with the partitioning of the main memory generally (and the RAM particularly) into two or more frequency bins to form a frequency histogram.

SUMMARY

The present invention is a pulse sorting apparatus of a preprocessor in a pulsed radiation detection system for acquiring an RF signal. In a preferred embodiment, the radiation detection system includes a central processing unit and an RF receiver for generating an instantaneous frequency measurement as well as RF signal data. The pulse sorting apparatus includes a main memory for recording the RF signal data, an addressing element that generates an available main memory address to store the RF signal data, and a recording element that stores the RF signal data at the available main memory address of the main memory within a frequency bin corresponding to the instantaneous frequency measurement of the RF signal, whereby the RF signal data are sorted in the main memory in the form of a frequency-based histogram.

By following the teachings of the several embodiments of the present invention, a pulse train comprised of substantially identical pulses, where each pulse is comprised of sample points in which the instantaneous frequency varies from one sample point to the next, will appear in the main memory histogram across multiple frequency bins. The benefit arising when, after acquiring two or more pulses of a pulse train, the frequency bins contain two or more data groups in which the data groups are separated in time by the PRI of the original pulse train.

BRIEF DESCRIPTION OF THE DRAWINGS

For a more complete understanding of the present invention and for further features and advantages, reference is now made to the following description taken in conjunction with the accompanying drawings, in which:

FIG. 4 is a memory map representing the RF signal data in the main memory according to a preferred embodiment; and FIG. 5 is a timing table illustrating the implementation of the pulse-sorting apparatus for generating a histogram according to a preferred embodiment of the present invention.

DETAILED DESCRIPTION OF THE INVENTION

Figure 1:
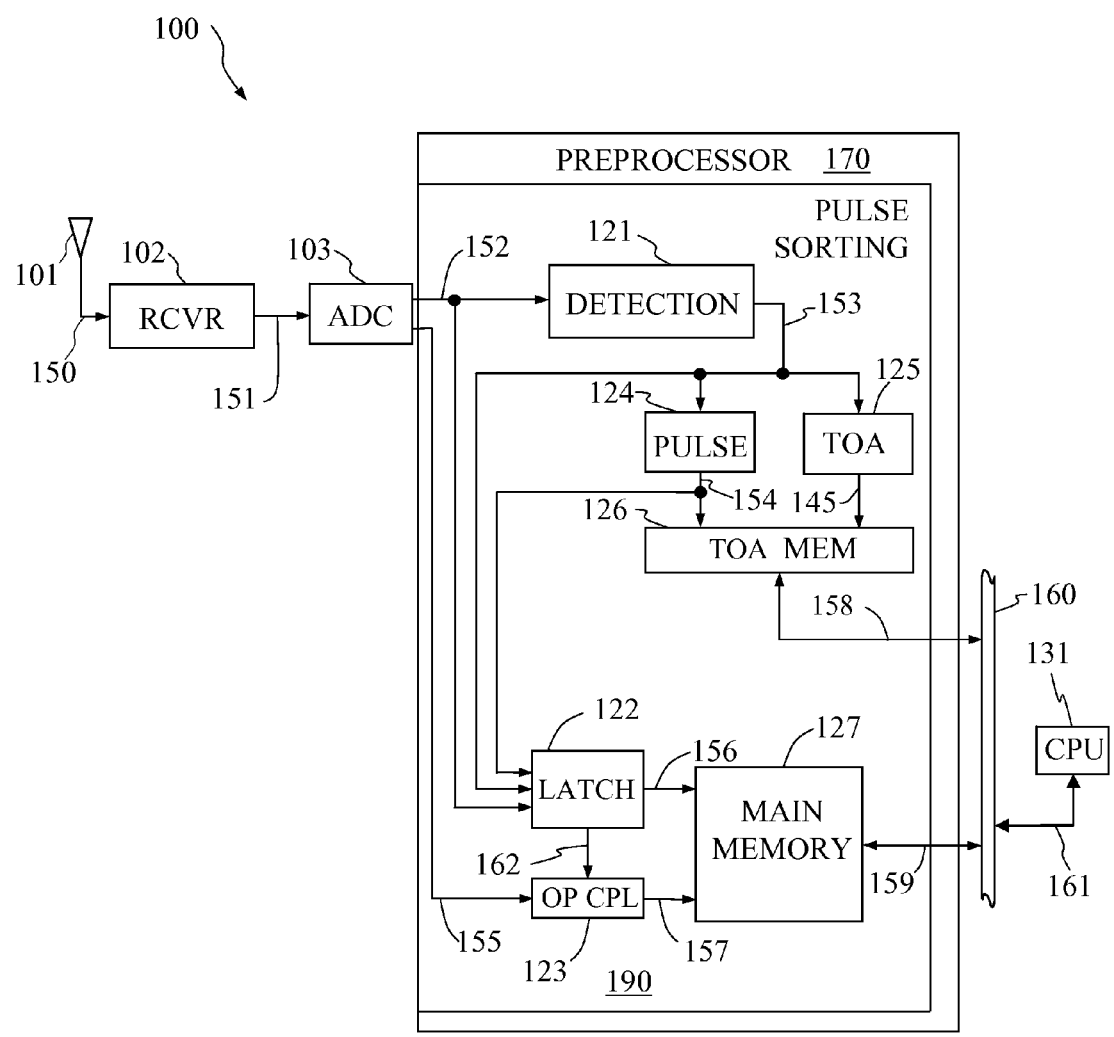
FIG. 1 is a block diagram illustrating the pulse-sorting apparatus of a pulsed radiation detection system according to an embodiment of the present invention.

The several embodiments of the present invention produce pre-sorted data with electronics minimally aided by extrinsic radar processing resources and provides this pre-sorted data to enable the processor to selectively retrieve those small portions of the pulse data that are most likely to correspond to a particular emitter within a multi-emitter environment. The several embodiments of the present invention accomplishes these objects through efficient data grouping and a bifurcation of the data processing along with the partitioning of the main memory generally, and the RAM particularly, into two or more frequency bins to form a frequency histogram.

The analog signals from a multi-channel receiver are converted to digital signals including digital amplitudes, phase differences, a frequency measurement and a temperature measurement are generated. The digital signal-processing path is then bifurcated in order to perform the necessary quantitative signal detection within a defined interval in order to record selectively a minimally requisite amount of signal data.

As a first step, each of the digital signals is conveyed to one of several identical shift registers comprising a bank of registers prior to being conditionally held in a first-in-first-out (FIFO) memory of a bank of FIFO memory devices, collectively providing a means for logical latching. In parallel with the temporal shift described above, the radiation detection system qualifies received signals before recording any data. The present invention provides signals of the one or more channels for which the received amplitudes exceed a CPU-defined threshold to a pulse validity detector for a test of pulse duration.

For as long as the amplitude signal of the selected channel remains valid, an output signal provides a time-shifted duration of the valid pulse, and this same output signal is further delayed and then applied in the window function to create a continuous gate signal. The gate signal represents the sampling window of the valid pulse of the selected channel when aligned with the digital signals after being delayed by the shift registers. The gate signal thus enables the RF data including the digital amplitude, phase difference, instantaneous frequency and receiver temperature to be recorded for each of the receiver channels and to then be stored for the duration of a valid pulse.

In addition to the digital signal data, the detection system of the several embodiments of the present invention also records the selected channel, pulse number and time corresponding to the TOA of the received RF signal as well as the end of the valid pulse. The pulse number is generated for each valid pulse irrespective of the pulse frequency, selected channel or TOA. The TOA is generated in the time delayed reference frame shifted by M sampling intervals. The TOA memory means is comprised of one or more memory devices where the TOA of the leading edge of a particular pulse and the TOA of the trailing edge of the same pulse may be stored, each in association with the pulse number.

Upon the conclusion of each valid pulse, the FIFOs contain the amplitude and phase difference for each channel, receiver temperature and instantaneous frequency of every digital sampling point of a valid pulse designated by a unique pulse number. This information for each sample point is collectively referred to as a "data group" and is recorded in the form of a frequency histogram in main memory.

Referring to FIG. 1, the pulse sorting apparatus 190 of the present invention is illustrated in the context of a digital radiation detection system 100. The system 100 includes a passive, principally microwave, antenna array 101 capable of detecting electromagnetic radiation over a broad range of frequencies from one or more emitters (not shown) including ground-based and airborne sources. The received radiation induces signals 150 to emanate from the antenna, or elements of the antenna array 101, which are conveyed to the multi-channel receiver 102 where they are filtered, amplified and demodulated. The receiver output 151 includes one or more analog signals preferably including amplitudes and phase differences. Although the receiver 102 acquires phase difference measurements, a quadrature detection system is equally suitable with appropriate modification to the signal detection means of the apparatus described herein. The receiver 102 or equivalent means of reception also must necessarily include means for acquiring instantaneous frequency measurements of the received radiation and, preferably, receiver temperature measurements used for calibration purposes. An analog-to-digital converter 103, ADC, digitizes the analog signals 151 exiting the receiver 102. The ADC 103 may be integral to the receiver or separate from it. The first part of ADC 103 output channel directed to the preprocessor 170 containing the pulse sorting apparatus 190 is comprised of digital signals 152 in the form of data streams that include measures of the RF signal amplitude, inter-channel phase differences and receiver temperature. The second part of ADC 103 output is the discrete, instantaneous RF signal frequency 155.

The digital signals of measure 152, specifically including the RF signal amplitude, are conveyed to a RF signal detection means such as a RF pulse detector 121 that in turn generates a detection signal 153 that causes the pulse counter 124 to generate a RF pulse number 154. The pulse counter or pulse counting means for generating RF pulse number can be an incremental add and hold counter.

According to the several embodiments of the present invention, the RF pulse number 154 is used to encode into the TOA memory 126 the time-of-arrival (TOA) 145 generated by TOA counter 125. The TOA counter 125 or TOA counter means is operatively coupled to the signal detector and outputs a RF signal TOA (leading edge, trailing edge, or both) upon qualification of the RF signal for storage in association with the RF pulse number 154. Upon the detection of a RF pulse and the generation of the detection signal 153, the digital signals measures 152 of the signal amplitude, inter-channel phase differences and receiver temperature are latched 122 and the data made available 156 to the main memory 127. The digital data are collectively referred to as a data group and are sent 162 to and stored in the main memory 127 according to the instantaneous RF frequency 155. The logic circuitry or other addressing means for generating an available main memory address to store the RF signal data is where one or more logic devices cause the instantaneous RF frequency 155 to be operatively coupled 123 to and made part of the address input 157 of the main memory 127 for the purpose of partitioning the memory into two or more frequency bins. The TOA memory 126 is made accessible 158 via a data bus 160 and may be read 161 by the central processing unit 131. As a result of the several embodiments of the present invention, the preprocessor constructs a structured data set in the form of a frequency-based histogram in which the received RF pulses are sorted into consecutive stacks of like-frequency data groups that are made CPU-accessible 159 via the data bus 160.

Figure 2:
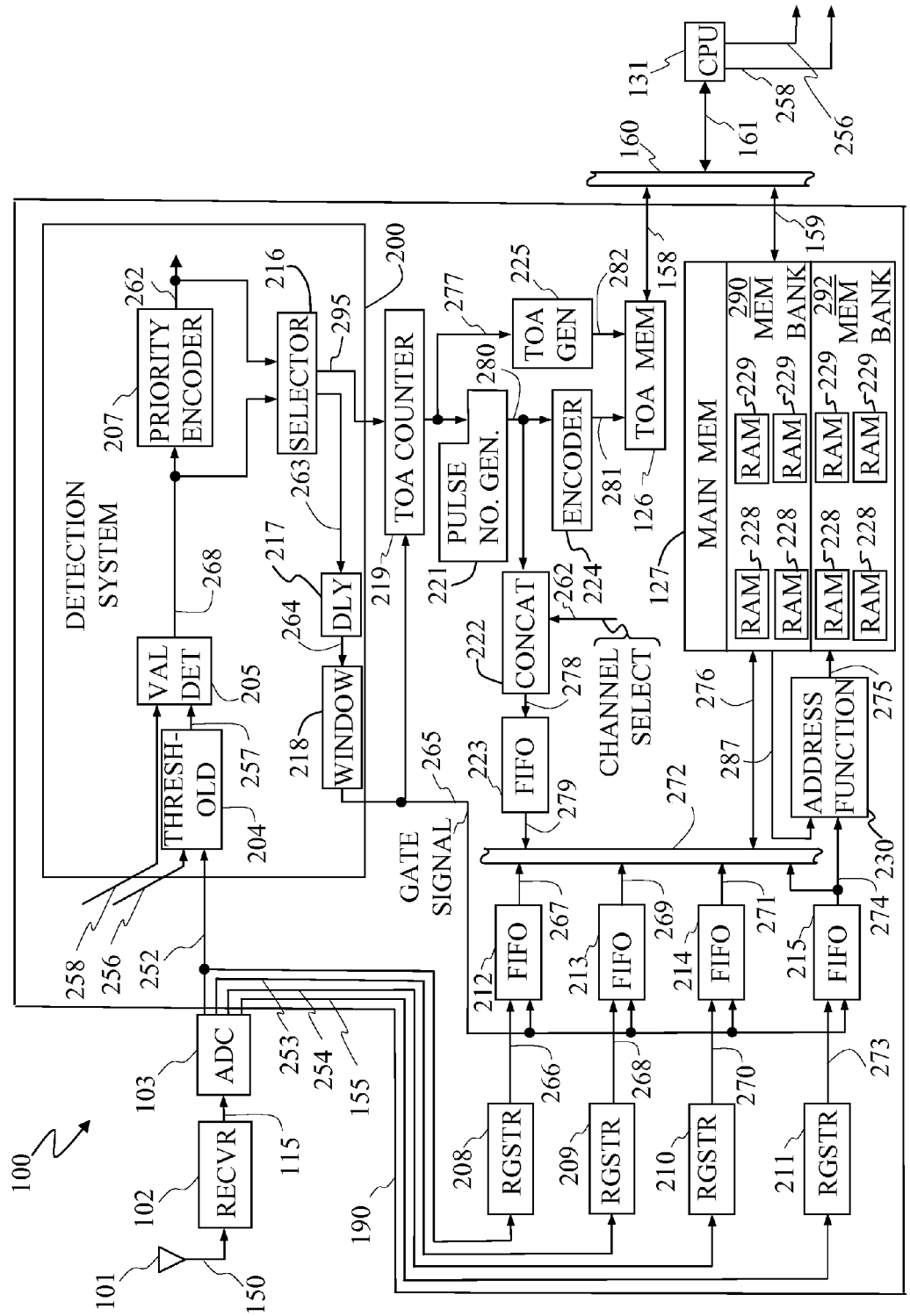
FIG. 2 is a detailed block diagram illustrating the pulse-sorting apparatus according to a preferred embodiment of the present invention.

Referring to FIG. 2, a detailed illustration of the pulse sorting apparatus of a preferred embodiment is provided. The first outputs of the ADC 103 are digital signals 152 (FIG. 1) which include digital amplitudes 252 (preferably one byte per channel), digital phase differences 253 (preferably one byte per channel) and a temperature measurement 254 (preferably one byte). The second output of the ADC 103 is the digital instantaneous frequency measurement 155 (preferably less than one byte).

As illustrated in FIG. 2, the digital signal-processing path, particularly that of the digital signal amplitude 252, is bifurcated in order to perform in a timely fashion the quantitative signal detection needed to selectively record a minimally sufficient amount of signal data. As a first step, each of the digital signals and frequency is conveyed to one of several identical shift registers within a bank of registers 208, 209, 210 and 211 prior to being held in the first-in-first-out (FIFO) memory of a bank of FIFO memory devices 212, 213, 214, and 215. For example, the digital amplitude signals shift register 208 receives serially the one or more digital amplitude signals and reproduces the signals in the form of a digital amplitude shift register output 266 after a fixed number of ADC 103 sampling intervals, M. In a preferred embodiment, the shift register delays the input signal for 64 clock cycles before conveying 266 the amplitude information to the first FIFO 212 where it is made available 267 for downloading to the main memory 127 via a data bus 272. The first FIFO 212, along with successive FIFOs 213–215, are write enabled by a continuous gate signal (or write enabler) 265 only after the radiation detection system 200 detects a RF signal that qualifies for recording in the manner described below. These FIFOs provide to respective shift registers the amplitude information 266, the phase differences information 268, the receiver temperature 270, and the instantaneous frequency 273.

In parallel with the temporal shift described above, the radiation detection system 200 qualifies received signals prior to recording any data within the FIFOs 212–215. The threshold value 256 is a programmable value provided by a CPU 131 and is capable of being updated. After a threshold test 204, the signals of the one or more channels for which the digital amplitudes 252 exceed the threshold value 256 are, in a preferred embodiment, conveyed 257 to the pulse validity detector 205. Pulse validity detector 205 flags with detection signal 268, or otherwise identifies, each of the channels in which the amplitude 252 exceeds the threshold value 256 for a number of consecutive sampling points as prescribed by the programmable value of A 258 generated by the CPU 131. Priority encoder 207 arbitrates between channels in the case that two or more channels simultaneously indicate the detection of a valid pulse.

For as long as the amplitude signal of the channel associable with priority encoder selected channel number 262 remains valid according to the validity detector 205, an output signal 263 will be asserted by a selector element 216. In addition, the end-of-valid pulse (EOVPls) 295 is generated by the selector element 216.

The output signal 263 thus signifies the duration of a valid pulse, albeit shifted in time according to the product of A and the time increment represented by a sampling interval of the ADC 103. In order to create a continuous gate signal 265, the delay block 217 further delays the output signal 263 by N sampling intervals before the output signal 264 is then applied in the window function 218. The gate signal 265 then represents the sampling window of the valid pulse of selected channel 262 when temporally aligned with the digital signals (i.e., digital amplitude 252, phase difference 253, temperature 254 and instantaneous frequency 155) after being delayed by the shift registers 208, 209, 210 and 211. The gate signal 265, as a write enable signal, thus causes the digital amplitude 252, phase differences 253, instantaneous frequency and receiver temperature 254 to be recorded for each of the one or more channels of the receiver 102 to be stored for the duration of a valid pulse sampling window. In addition the gate signal 265 effects the TOA counter 219 to cause the signal TOA_Valid_Pulse 277 to be transmitted.

In addition to the data pertaining to the digital measure signals 155, 252, 253, and 254, the pulse sorting apparatus 190 of the present invention also records the selected channel 262, pulse number 280, time corresponding to the TOA 282 of the received RF signal, and preferably the end of a valid pulse. The pulse number 280 is output by the pulse number generator 221 for each valid pulse based on a signal, TOA_Valid_Pulse 277, made available by the TOA counter 219. The TOA output 282 by the TOA generator 225 is made available to the TOA memory 126 based on a signal, TOA_Valid_Pulse 277, made available by the TOA counter 219.

Figure 3:
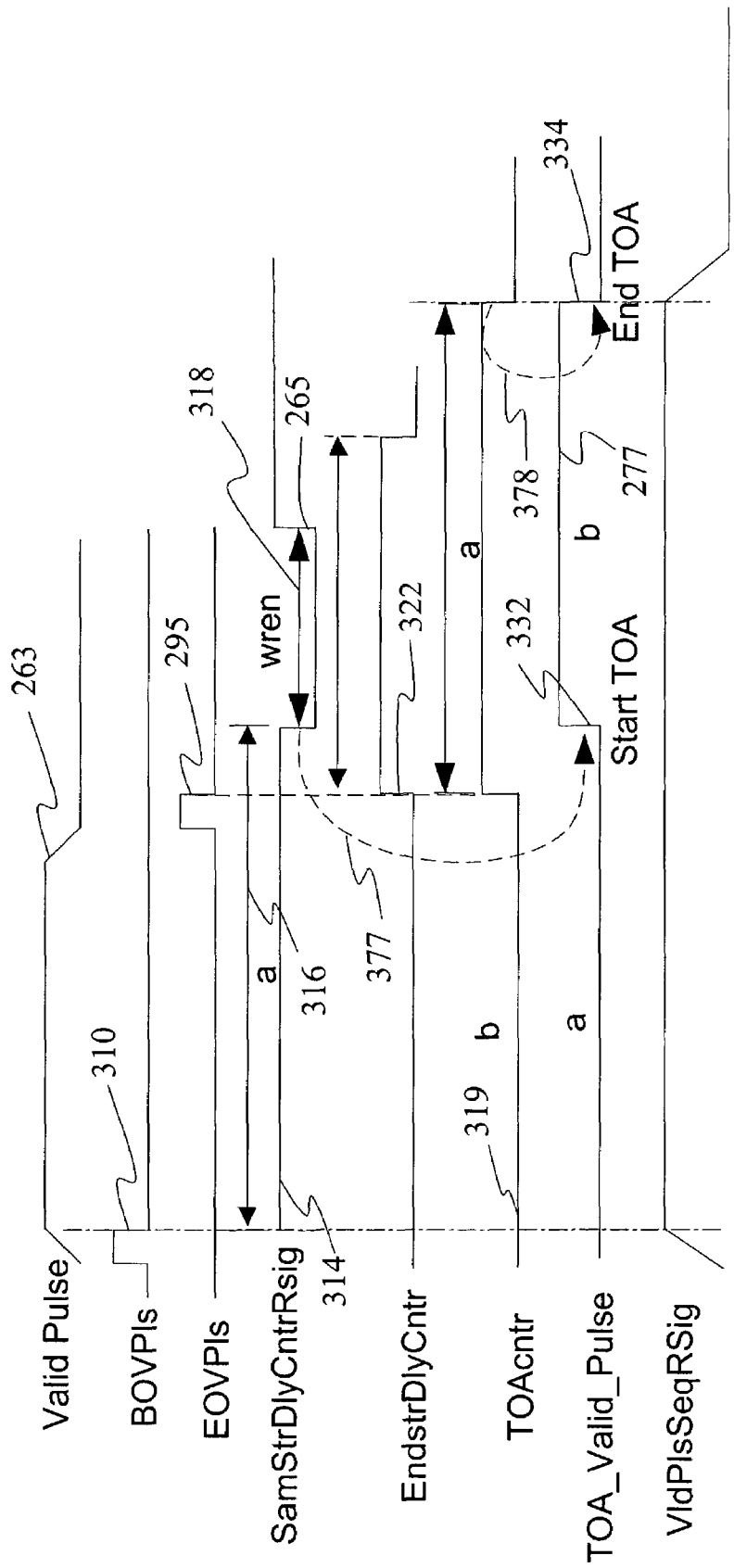
FIG. 3 is a timing table illustrating the starting and stopping of the time-of-arrival of an embodiment of the present invention.

FIG. 3 illustrates that when an input pulse satisfies the criteria of n consecutive threshold crossings, a beginning-of-valid-pulse (BOVPls) 310 is generated as it tracks valid pulse 263, and a counter is started to delay the wren signal 265 to the storage FIFOs. This delay plus the wren signal 265 is shown as SamStrDlyCntrRSig 314 where both the delay a 316 and the width of wren 318 are programmable. When the detected input pulse satisfies the criteria of m consecutive samples where the threshold was not crossed, the end-of-valid pulse (EOVPls) 295 is generated, starting the EndStrDlyCntr 322. The purpose of this counter is to mark the event at end-of-count where the sample that triggers the EOVPls 295 event will be at the output of the delay FIFO and available for storage. Since this is the last sample of interest, the signal wren 265 is not allowed to be active beyond this point. This imposes a limit on the delay such that samples taken beyond the end of the pulse may not be stored, preventing the case where the delay has been set for a wide pulse, but a narrow pulse has been detected, and invalid samples are stored which is equally important in related gating techniques. The signal wren 265 initiates 377 the signal TOA_Valid_Pulse 277, the rising edge of which saves the start TOA 332. The falling edge of TOAcntr 319 triggers 378 the end of the TOA_Valid_Pulse 277 which act to save the end TOA 334. It is therefore notable that if the signal wren 265 is prevented, the TOA values are not stored.

Returning to FIG. 2, in consideration of the present memory arrangements, the selected channel number 262 that is preferably represented by two bits, and a pulse number 280 that is preferably represented by 12 bits, are concatenated 222 to form a two-byte number 278 stored at a fifth FIFO 223 and thereby made available to the main memory 127. The pulse number 280 in an alternative embodiment is encoded 224 with a one or zero to signify the leading or trailing edges of the valid pulse. Preferably, the encoded pulse number 281 is applied to the address input of the TOA memory 126 for recording data pertaining to the TOA of the beginning and end of each valid pulse.

Upon the conclusion of each valid pulse the first four FIFOs 212–215 along with the fifth FIFO 223 contain and make available the amplitude 267 and phase difference 269 for each channel, receiver temperature 271 and instantaneous frequency 274 of every digital sampling point of a valid pulse designated by a unique pulse number 279. This information pertaining to each sample point, or data group, is recorded in the form of a frequency histogram in main memory 127 by way of a second data bus 272 and communicating 276 with the main memory 127 as described below. The second data bus could also merely be an extension of the first data bus 160.

A feature of the present invention is, in part, the recording means for storing the RF signal data at the available main memory address by way of partitioning the main memory 127 generally, and the RAM 228 particularly, into two or more frequency bins to form a frequency histogram for efficiently recording, recalling and processing RF pulse data with a minimal amount of central processing unit 131 intervention. In a preferred embodiment, the main memory 127 is effectively partitioned into 32 frequency bins by using a conditioned form of the instantaneous frequency 274 as the address input to main memory 127. More particularly, main memory 127 of the preferred embodiment comprises two banks of memory, a first bank 290 and a second bank 292, that are alternately written to and read from at each radar interrupt cycle. Each bank of memory in a preferred embodiment includes a pair of 8×4M RAM devices 228 for storing 16-bit words. Each bank further includes a pair of 8×32 k RAM devices 229 for storing multiple "last address" data, each last address representing the memory address last used to record a data group within a particular frequency bin as part of the histogram of the 16-bit word RAM 228. With regards to the "last address" data, since the address for a bin is incremented when that bin is accessed, it contains the histogram of the histogram memory, and, as such may be accessed by the signal processing.

Prior to recording a data group, the addressing function 230 of a preferred embodiment causes to be retrieved from the one of the pair of 8×32 k RAM devices 229 the memory address of the prior recent data group 287 stored within the frequency bin corresponding to the instantaneous frequency 274. As an incrementing means, the addressing function 230 then increments 275 the last address 287 as necessary in order to locate the next data group.

In accordance with the several embodiments of the present invention, the main memory 127 is divided into multiple unique frequency bins, each bin containing consecutively ordered pulse data where each data group includes a complete record of phase difference, amplitude and calibration data as well as a pulse number that serves as a pointer to the corresponding TOA memory containing the TOA of the pulse.

The RF signal data structure described corresponds to a six-channel receiver and includes six distinct amplitude and phase difference measurements. In a preferred embodiment, the channel selection state 262, i.e., the receiver channel in which the RF signal was detected and qualified, is represented by a three-bit number and is incorporated into the 16-bit pulse number word. Although the number and order of the RF signal data will vary depending on the design specifications of the pulse detection system, the inclusion of multi-parameter RF signal data in the histogram represent a significant departure from one-dimensional pulse sorting techniques.

Referring to FIG. 4, a memory map, according to the preferred embodiment, representing a data group 400 in the main memory 127 is illustrated. A data group 400 is comprised of an RF pulse number 279 and the RF signal data including an instantaneous frequency measurement 274, one or more digital amplitudes 267, one or more digital phase differences 269 at one byte per channel, and a temperature measurement 271 of one byte.

Referring to FIG. 5, a timing table illustrating the implementation of the pulse sorting apparatus for generating a histogram according to a preferred embodiment of the present invention is disclosed. The figure illustrates that the preferred embodiment samples and processes data continually in order to accommodate long dwell times.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result.

In addition to the equivalents of the claimed elements, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

The invention claimed is:

1. A pulse sorting apparatus of a preprocessor in a pulsed radiation detection system for acquiring a radio frequency (RF) signal, the radiation detection system including a central processing unit and a RF receiver for generating an instantaneous frequency measurement as well as RF signal data; the apparatus comprising:
   (a) a main memory for recording the RF signal data;
   (b) addressing means, responsive to the receiver, for generating an available main memory address to store the RF signal data; the available main memory address residing within one of two or more frequency bins where each frequency bin corresponds to a substantially unique RF signal bandwidth; and
   (c) recording means, responsive to the receiver, for storing the RF signal data at the available main memory address of the main memory within a frequency bin corresponding to the instantaneous frequency measurement of the RF signal;
   whereby the RF signal data are sorted in the main memory in the form of a frequency-based histogram.

2. The pulse sorting apparatus of claim 1 wherein the addressing means for generating an available main memory address to store RF signal data comprises a device for retrieving from one of a pair of random access memory (RAM) devices of a memory address of a most recent prior data group stored within said instantaneous frequency bin.

3. The pulse sorting apparatus of claim 1 wherein the recording means comprises a gating signal, latches for the recordation of digital measures of signal amplitude, interchannel phase difference and receiver temperature and, respective first-in-first-out devices (FIFOs) enabled by said gating signal; said gating signal being an enabling signal based on qualifying detected RF signals.

4. The pulse sorting apparatus of claim 3 wherein the apparatus further includes pulse counting means for generating a RF pulse number; said RF pulse number sequentially storable with the RF signal data by the recording means in the main memory.

5. The pulse sorting apparatus of claim 4 wherein the pulse counting means for generating RF pulse number is an incremental add and hold counter.

6. The pulse sorting apparatus of claim 4 wherein the apparatus further includes a time-of-arrival memory that stores a RF signal time-of-arrival at an address location given by the RF pulse number, whereby the RF pulse number in main memory serves as a pointer to the RF signal time-of-arrival in the time-of-arrival memory.

7. The pulse sorting apparatus of claim 3 wherein the apparatus further includes a last address memory for storing two or more previous main memory addresses; one previous main memory address for each of the frequency bins.

8. The pulse sorting apparatus of claim 7 wherein the main memory comprises two banks of memory devices; the two banks being alternately written to by the pulse-sorting apparatus and read from by the central processing unit at each radar interrupt cycle.

9. The pulse sorting apparatus of claim 7 wherein the addressing means for generating an available main memory address to store RF signal data further comprises a device for incrementing the last address.

10. A pulse sorting apparatus of a preprocessor in a pulsed radiation detection system for acquiring a radio frequency (RF) signal, the radiation detection system including a central processing unit and a digital receiver for generating an instantaneous frequency measurement as well as RF signal data; the apparatus comprising:
   (a) pulse counting means, responsive to the digital receiver, for generating a unique RF pulse number for each RF signal received;
   (b) time of arrival (TOA) memory means, responsive to the pulse counting means, for recording RF signal TOA; the RF signal TOA being stored in the TOA memory means at an address location given by the RF pulse number; and
   (c) a main memory, responsive to the digital receiver and the pulse counting means, for recording the RF pulse number and RF signal data; the RF signal data comprising one or more RF signal amplitude and phase measurements; the RF signal data being recorded at a main memory address of the main memory means in one of a plurality of frequency bins where each frequency bin corresponds to a unique RF signal bandwidth; the RF signal data being recorded in the frequency bin corresponding to the instantaneous frequency measurement of the RF signal;
   whereby the RF signal data are sorted in the main memory in the form of a frequency-based histogram.

11. The pulse sorting apparatus of claim 10 wherein the pulse counting means for generating RF pulse number is an incremental add and hold counter.

12. The pulse sorting apparatus of claim 10 wherein the TOA memory means for recording the RF signal TOA comprises one or more memory devices whereby the RF signal TOA of a leading edge of a pulse, the pulse having a pulse number, and the RF signal TOA of a trailing edge of the pulse is storable, each in association with the pulse number.

13. The pulse sorting apparatus of claim 10 wherein the TOA memory means for recording the RF signal TOA comprises one or more memory devices whereby the RF signal TOA of a trailing edge of a pulse, the pulse having a pulse number, is storable in association with the pulse number.

14. The pulse sorting apparatus of claim 10 wherein the TOA memory means for recording the RF signal TOA comprises one or more memory devices whereby the RF signal TOA of a leading edge of a pulse, the pulse having a pulse number, is storable in association with the pulse number.

15. The pulse sorting apparatus of claim 10 wherein the RF signal data of each frequency bin of the main memory is consecutively stored.

16. The pulse sorting apparatus of claim 15 wherein the apparatus further includes a last address means, the last address means comprising:
   (a) a last address memory for recording last main memory address used to record RF signal data within each frequency bin of the main memory; and
   (b) incrementing means for incrementing the last main memory address used to generate a new main memory address at which current RF signal data are stored in main memory.

17. The pulse-sorting apparatus of claim 16 wherein the incrementing means for incrementing the last main memory address used to generate a new main memory address at which current RF signal data are stored in main memory is an addressing function that increments the last address iteratively until a next data group is located.

18. The pulse-sorting apparatus of claim 16 wherein the apparatus further comprises latching means, responsive to the pulse counting means and digital receiver, for latching the RF pulse number, RF signal data and instantaneous frequency measurement and thereby making the pulse number, signal data and frequency measurement available to the main memory.

19. The pulse sorting apparatus of claim 18 wherein the latching means comprises one or more shift registers and corresponding first-in-first-out (FIFO) memory operatively coupled to the main memory.

20. The pulse-sorting apparatus of claim 19 wherein the apparatus further includes RF signal detection means for qualifying the RF signal received.

21. The pulse-sorting apparatus of claim 20 wherein the FIFO memory receives a write enable signal by way of the RF signal detection means; the FIFO memory being write enabled in such a way as to store a RF signal leading edge.

22. The pulse-sorting apparatus of claim 21 wherein the main memory comprises two banks of memory devices; the two banks alternately, with each radar interrupt cycle, writable by the pulse sorting apparatus and readable from the central processing unit.

23. A pulse-sorting apparatus comprising:
   (a) a signal detector, wherein the signal detector qualifies a plurality of incoming RF signals from a digital receiver;
   (b) a pulse counter, operatively coupled to the signal detector, wherein the pulse counter generates a unique RF pulse number for each RF signal;
   (c) a time-of-arrival (TOA) counter, operatively coupled to the signal detector, wherein the TOA counter outputs an RF signal TOA upon qualification of an RF signal;
   (d) a TOA memory element having an address input and a data input, the address input operatively coupled to the pulse counter and data input operatively coupled to the TOA counter, whereby the RF signal TOA is stored at an address location given by the RF pulse number;
   (e) a latch, responsive to the digital receiver and pulse counter, wherein the latch latches RF signal data, of the RF signal, the RF pulse number and an instantaneous frequency measurement provided by the digital receiver;
   (f) a memory addressing element, operatively coupled to the digital receiver, wherein the digital receiver generates a main memory address for storing the RF signal data and the RF pulse number; the main memory address residing within a frequency bin corresponding to the instantaneous frequency measurement; the frequency bin being one of two or more frequency bins where each frequency bin corresponds to a unique RF signal bandwidth; and
   (g) a main memory recorder, wherein the main memory recorder records the RF signal data, instantaneous frequency measurement and RF pulse number at the main memory address; the main memory including an address input and a data input; the data input operatively coupled to the latch and pulse counter; the address input operatively coupled to the latch and the memory addressing element;
   whereby the central processing unit retrieves pre-sorted RF signal data from the main memory and RF signal TOA from the TOA memory.

* * * * *